(12) United States Patent
Baril et al.

(10) Patent No.: US 7,474,510 B1
(45) Date of Patent: Jan. 6, 2009

(54) DISK DRIVE HEAD RESET FOR PARKED HEAD USING CLOSELY SPACED MAGNET

(75) Inventors: Lydia Baril, Bouc Bel Air (FR); Albert J Wallash, Morgan Hill, CA (US)

(73) Assignee: Seagate Technology Llc, Scotts Valley, CA (US)

( * ) Notice: Subject to any disclaimer, the term of this patent is extended or adjusted under 35 U.S.C. 154(b) by 322 days.

(21) Appl. No.: 11/031,333

(22) Filed: Jan. 7, 2005

Related U.S. Application Data

(60) Provisional application No. 60/535,008, filed on Jan. 8, 2004.

(51) Int. Cl.
*G11B 5/54* (2006.01)
*G11B 21/22* (2006.01)

(52) U.S. Cl. .................................. 360/256.2
(58) Field of Classification Search ................ 360/256, 360/256.2
See application file for complete search history.

(56) References Cited

U.S. PATENT DOCUMENTS

| | | | |
|---|---|---|---|
| 5,502,692 A * | 3/1996 | Osato ...................... 369/13.42 |
| 5,657,190 A * | 8/1997 | Araki et al. .................. 360/324 |
| 5,783,981 A * | 7/1998 | Abboud et al. ............... 335/284 |
| 5,969,523 A | 10/1999 | Chung et al. ................. 324/252 |
| 6,052,263 A * | 4/2000 | Gill ........................ 360/324.11 |
| 6,118,622 A | 9/2000 | Gill .............................. 360/66 |
| 6,275,028 B1 * | 8/2001 | Matsui et al. ................ 324/210 |
| 6,324,029 B1 * | 11/2001 | Matsubara et al. ............. 360/75 |
| 6,366,420 B1 | 4/2002 | Ranmuthu et al. ............. 360/66 |
| 6,922,884 B2 * | 8/2005 | Guo et al. ................... 29/603.1 |
| 6,958,891 B2 * | 10/2005 | Bae et al. .................. 360/254.3 |
| 2003/0099054 A1 | 5/2003 | Kamijima ..................... 360/59 |
| 2004/0126620 A1 * | 7/2004 | Viehland et al. .............. 428/692 |
| 2005/0105204 A1 | 5/2005 | Bloodworth et al. ........... 360/75 |

OTHER PUBLICATIONS

U.S. Appl. No. 10/859,917, filed Jun. 3, 2004, Yan et al.

\* cited by examiner

*Primary Examiner*—Brian E Miller
*Assistant Examiner*—Adam B Dravininkas

(57) ABSTRACT

A disk drive includes a magnet (152) for resetting a corresponding head (138). The magnet (152) is located on or close to a load/unload ramp (140') that is used to park the head (138), such that the magnet (152) is spaced from its corresponding parked head (138) by distance of no more than about 1 millimeter when the head (138) is parked. The magnet (152) may be either a permanent magnet or an electromagnetic which induces a magnetic field upon the head (138) to reset its magnetization.

26 Claims, 9 Drawing Sheets

DISK DRIVE HEAD RESET FOR PARKED HEAD USING CLOSELY SPACED MAGNET

CROSS-REFERENCE TO RELATED APPLICATIONS

This patent application claims priority under 35 U.S.C. §119(e) to U.S. Provisional Patent Application Ser. No. 60/535,008, that was filed on Jan. 8, 2004, that is entitled "Built-In Drive Magnet for Reset of Magnetic Recording Heads," the entire disclosure of which is hereby incorporated by reference in its entirety herein.

FIELD OF THE INVENTION

The present invention generally relates to the field of disk drives and, more particularly, to resetting a disk drive head using a magnet that is closely spaced from the disk drive head when parked on a load/unload ramp.

BACKGROUND OF THE INVENTION

Disk drive heads are sensitive devices that can be damaged through excessive use and/or excessive electrical stress (e.g., electrostatic discharge, or "ESD"). Head damage may include a misalignment of the magnetic orientation of one the head's components or layers. For example, a pinned layer of the head is intended to maintain a particular magnetic orientation. A free layer of the head, on the other hand, has a magnetic orientation that moves about freely as the name suggests. The pinned layer and the free layer of a given head operate in tandem to detect electromagnetic impressions on a magnetic disk of the disk drive. Detection of the electromagnetic impressions occurs by means of changing the disk drive head resistance due to the changing of the magnetic orientation of its free layer with respect to its pinned layer. Excessive use and/or excessive electrical stress may have a tendency to misalign the magnetic orientation of the pinned layer of the head. When the magnetic orientation of the pinned layer of the head becomes misaligned with respect to an optimal magnetic orientation, detection of magnetic impressions on the disk may be impaired and data quality may degrade.

Certain methods exist which attempt to realign the magnetic orientation of the pinned layer of a head by transferring a pulse of electric current directly to the disk drive head. For example, as electric current is transferred to the pinned layer of the head, the current tends to realign the magnetic orientation of this pinned layer. However, as disk drive head sizes have decreased in an effort to enhance/accommodate increased data storage capacity of the disk drive, the disk drive heads have become increasingly sensitive to certain electrical effects. Because smaller disk drive heads may be more electrically sensitive than larger disk drive heads, pulsed electric current methods often exacerbate the problem of magnetic alignment by causing physical damage to the disk drive head, which may not be repairable.

BRIEF SUMMARY OF THE INVENTION

The present invention generally relates to resetting disk drive heads, including at a time when each head is parked on a load/unload ramp. In one embodiment, the resetting function for each head is provided by a stationary magnet.

A first aspect of the present invention is generally directed to a disk drive that includes at least one data storage disk or other appropriate computer-readable storage medium (hereafter a "first data storage disk"), a head positioner assembly, a drive that is at least operatively interconnected with the head positioner assembly, a load/unload ramp, and a first magnet. The head positioner assembly includes a first head that is associated with the first data storage disk. For instance, information may be exchanged between the first head and the first data storage disk. The first magnet is disposed in proximity to the first head when the head positioner assembly is parked on the load/unload ramp.

Various refinements exist of the features noted in relation to the first aspect of the present invention. Further features may also be incorporated in the first aspect of the present invention as well. These refinements and additional features may exist individually or in any combination. The disk drive may be of any appropriate configuration that uses a load/unload ramp to dispose its head or heads in spaced relation to their corresponding data storage disk when parked. For instance, the head positioner assembly may include an actuator (e.g., an actuator body with one or more actuator or head arms/arm tips that extend from this actuator body; one or more individual actuator arms), a suspension for each actuator arm, and a slider interconnected with each suspension. Each slider may include a head of any appropriate type (e.g., giant magnetoresistive). Further in this regard, the drive for the head positioner assembly may be of any appropriate type, such as a voice coil motor or the like. Other types of drives may be appropriate for the head positioner assembly, such as a linear actuator. The various components of the disk drive may be enclosed in any appropriate manner, such as by detachably interconnecting a cover with a base plate. Therefore, the first head may be reset by the first magnet without having to disassemble the disk drive in any manner (e.g., no need to remove the cover from the base plate), and in fact may be reset each time that the head positioner assembly is parked on the load/unload ramp (if required).

The load/unload ramp may be of any appropriate configuration and disposed at any appropriate location within the disk drive. In one embodiment the load/unload ramp is disposed under the first data storage disk. In another embodiment, the load/unload ramp is disposed beyond a perimeter of the first data storage disk. Preferably, the disk drive includes a magnet for resetting each of its heads when the head positioner assembly is parked on the load/unload ramp. Therefore, the disk drive may include a plurality of head-resetting magnets that are each disposed in proximity to their corresponding head when the head positioner assembly is parked on the load/unload ramp. Any such plurality of head-resetting magnets may be incorporated into the disk drive in any appropriate manner, such as using something similar to an E-block or the like or incorporating multiple head-resetting magnets into the structure of the load/unload ramp in any appropriate manner.

The first magnet may be integrated into the drive in any appropriate manner. For instance, the first magnet may be mounted or otherwise incorporated into the structure of the load/unload ramp. The first magnet also may be of any appropriate size/shape/configuration/type. In one embodiment, the first magnet is in the form of a permanent magnet. In another embodiment, the first magnet is in the form of an electromagnet. In any case, the first magnet is used to reset the first head. Preferably the first magnet provides this function by being closely spaced from the first head when the head positioner assembly is parked on the load/unload ramp. In one embodiment, the first magnet is disposed no more than about 1 millimeter from the first head when the head positioner assembly is parked on the load/unload ramp. Although it may be possible to actually have contact between the first magnet and the first head when the head positioner assembly is parked on the load/unload ramp, typically at least a slight spacing therebetween exists. One way to provide such a closely spaced relationship between the first magnet and the first head would be to mount the first magnet on the body of the load/unload ramp, or otherwise incorporate the first magnet into the structure of the load/unload ramp as noted. Disposing the first head within a longitudinal magnetic field of the first magnet having a magnetic flux density of at least about 2,750 G (i.e., "gauss") should be sufficient to reset the first head when disposed no more than about 1 millimeter from the first head in its parked position.

The first magnet preferably generates a longitudinal magnetic field that is sufficient to re-align the magnetic field of the first head when the head positioner assembly is parked on the load/unload ramp. In one embodiment the first magnet has a longitudinal magnetic field strength of at least about 2,000 Oe (i.e., oersteds), and more preferably of at least about 5,000 Oe, and the first head is disposed within this magnetic field when the head positioner assembly is parked on the load/unload ramp. In another embodiment, the first magnet has a magnetic flux density of at least about 2,750 G, and more preferably of at least about 3,000 G, and the first head is disposed within the first magnet's magnetic field when the head positioner assembly is parked on the load/unload ramp.

A second aspect of the present invention is generally directed to a disk drive that includes at least one data storage disk or other appropriate computer-readable storage medium (hereafter a "first data storage disk"), a head positioner assembly, a drive that is at least operatively interconnected with the head positioner assembly, a load/unload ramp, and a first magnet. The head positioner assembly includes a first head that is associated with the first data storage disk. For instance, information may be exchanged between the first head and the first data storage disk. The first magnet is disposed no more than about 1 millimeter from the first head when the head positioner assembly is parked on the load/unload ramp. This second aspect may use the various features discussed above in relation to the first aspect and in the above-noted manner.

A third aspect of the present invention is generally directed to a disk drive that includes at least one data storage disk or other appropriate computer-readable storage medium (hereafter a "first data storage disk"), a head positioner assembly, a drive that is at least operatively interconnected with the head positioner assembly, a load/unload ramp, and a first magnet. The head positioner assembly includes a first head that is associated with the first data storage disk. For instance, information may be exchanged between the first head and the first data storage disk. The first magnet is mounted on or otherwise part of the structure of the load/unload ramp. This third aspect may use the various features discussed above in relation to the first aspect and in the above-noted manner.

DETAILED DESCRIPTION OF THE INVENTION

Figure 1:
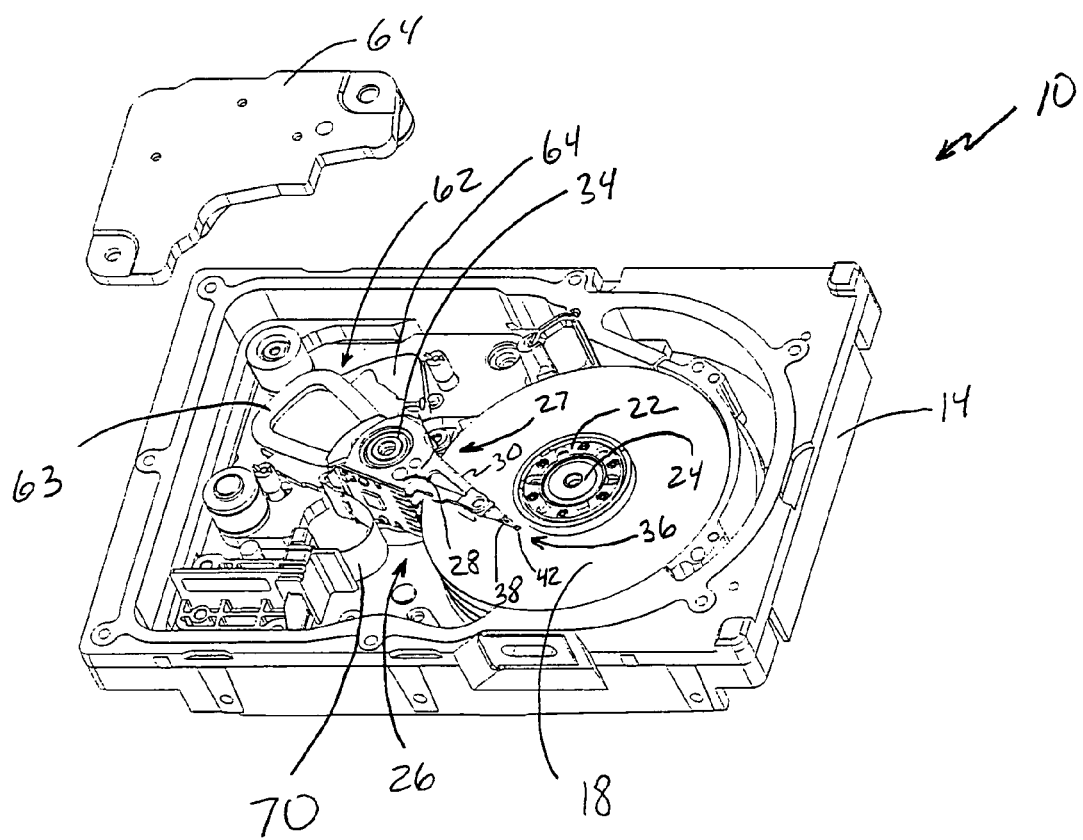
FIG. 1 is a perspective view of a prior art disk drive that may be adapted to incorporate one or more head-resetting magnets that are disposed close to a corresponding head when in a parked position using a load/unload ramp, such an adaptation not being known to be within the prior art.
Figure 2:
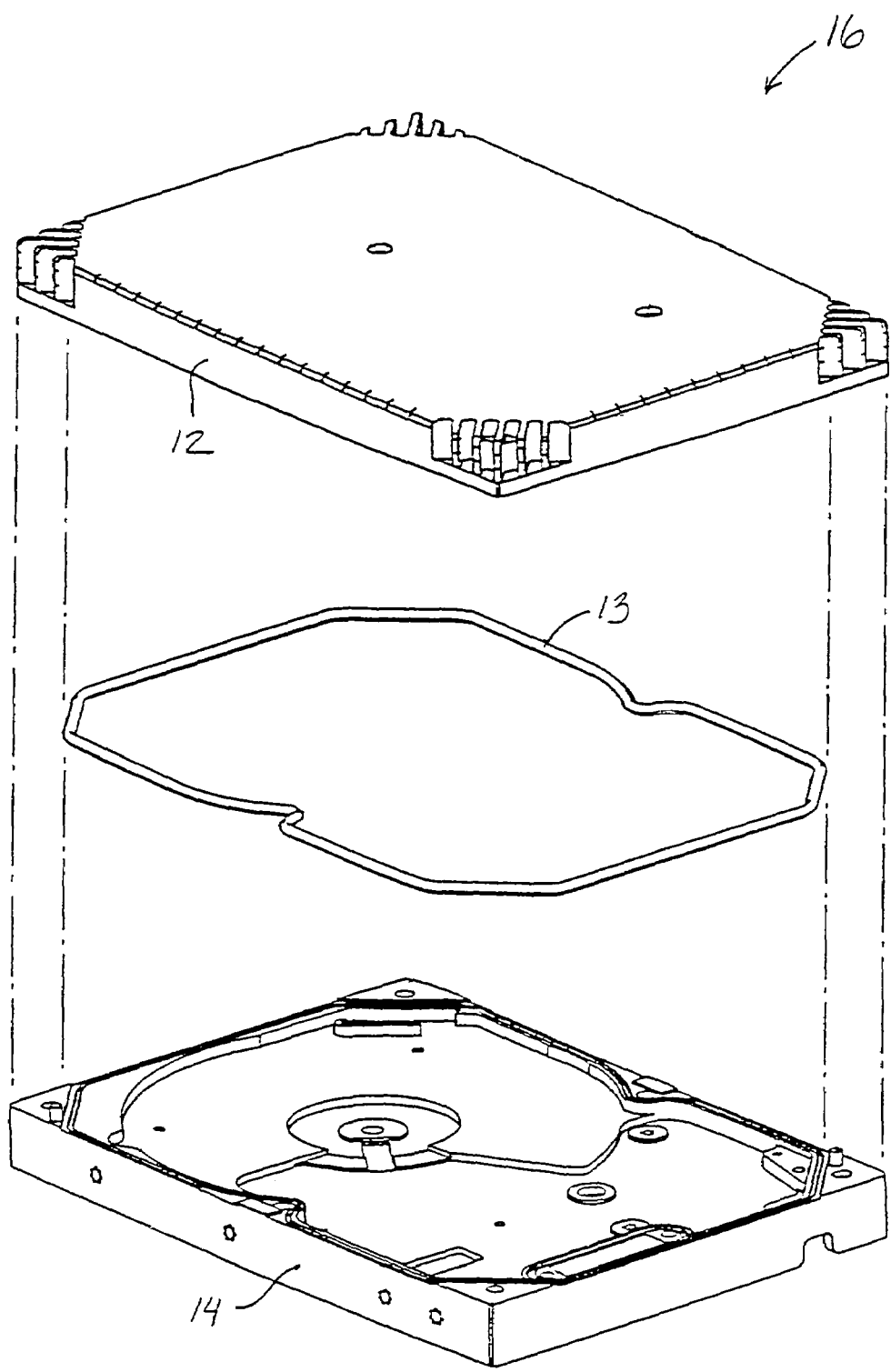
FIG. 2 is an exploded, perspective view of a prior art disk drive housing for the disk drive of FIG. 1.

The present invention will now be described in relation to the accompanying drawings which at least assist in illustrating its various pertinent features. One embodiment of a prior art disk drive 10 is illustrated in FIGS. 1-4. However, this disk drive 10 may be adapted to incorporate one or more magnets that are closely spaced to its heads when parked, the combination of which is not known to be in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
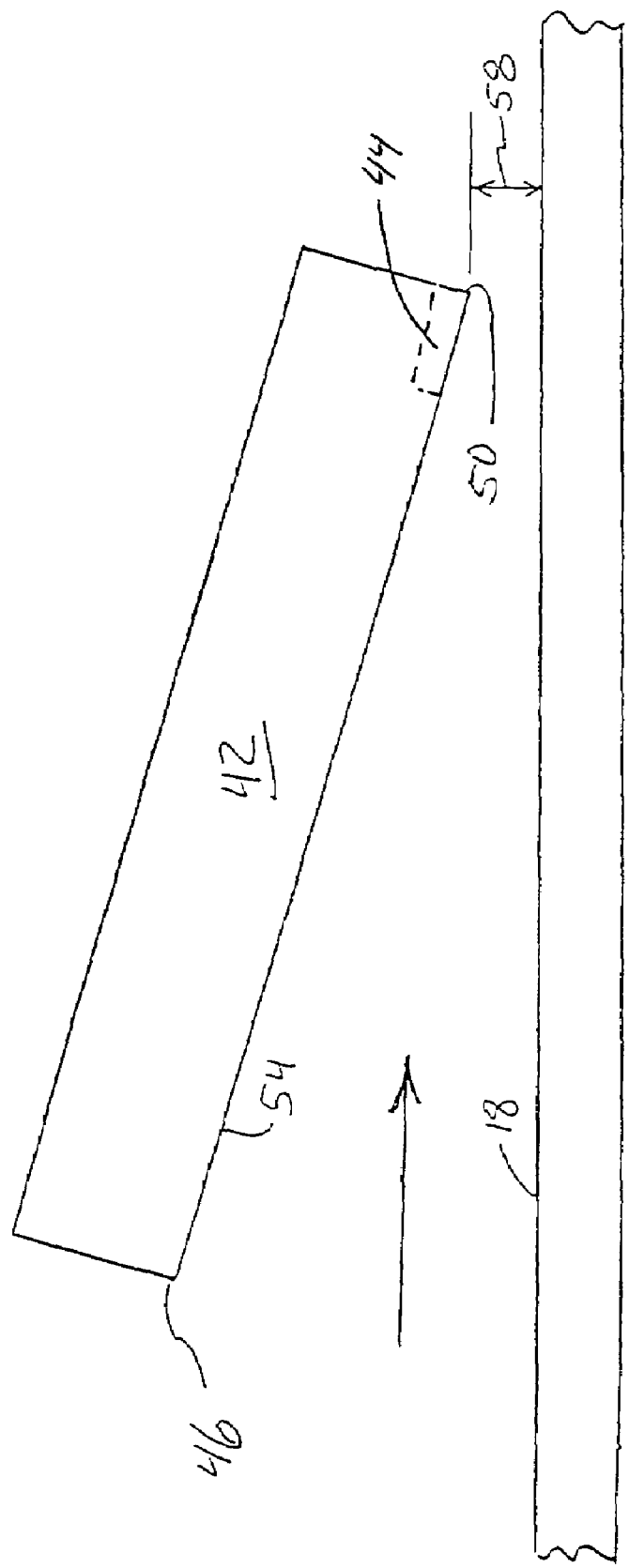
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The head(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
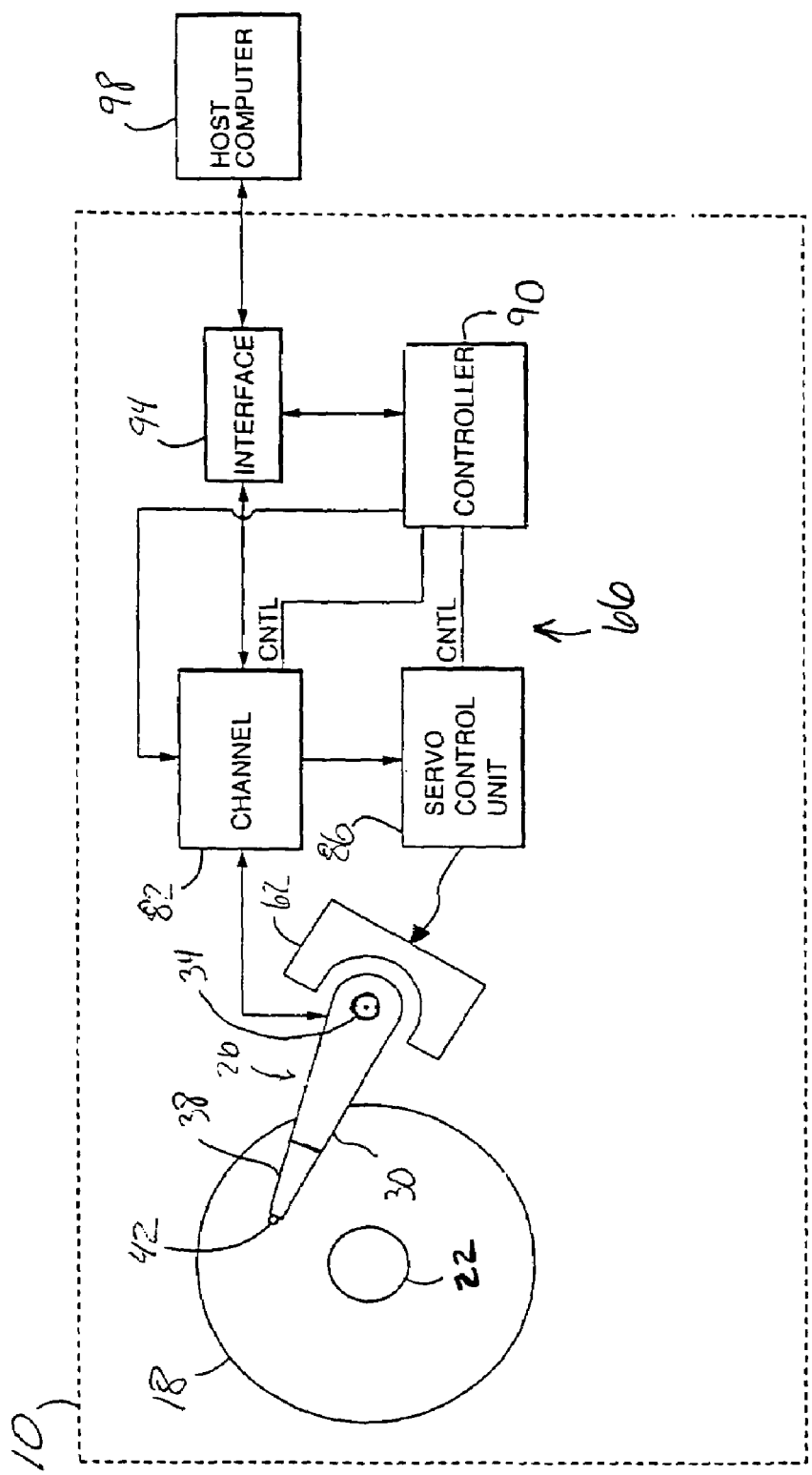
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
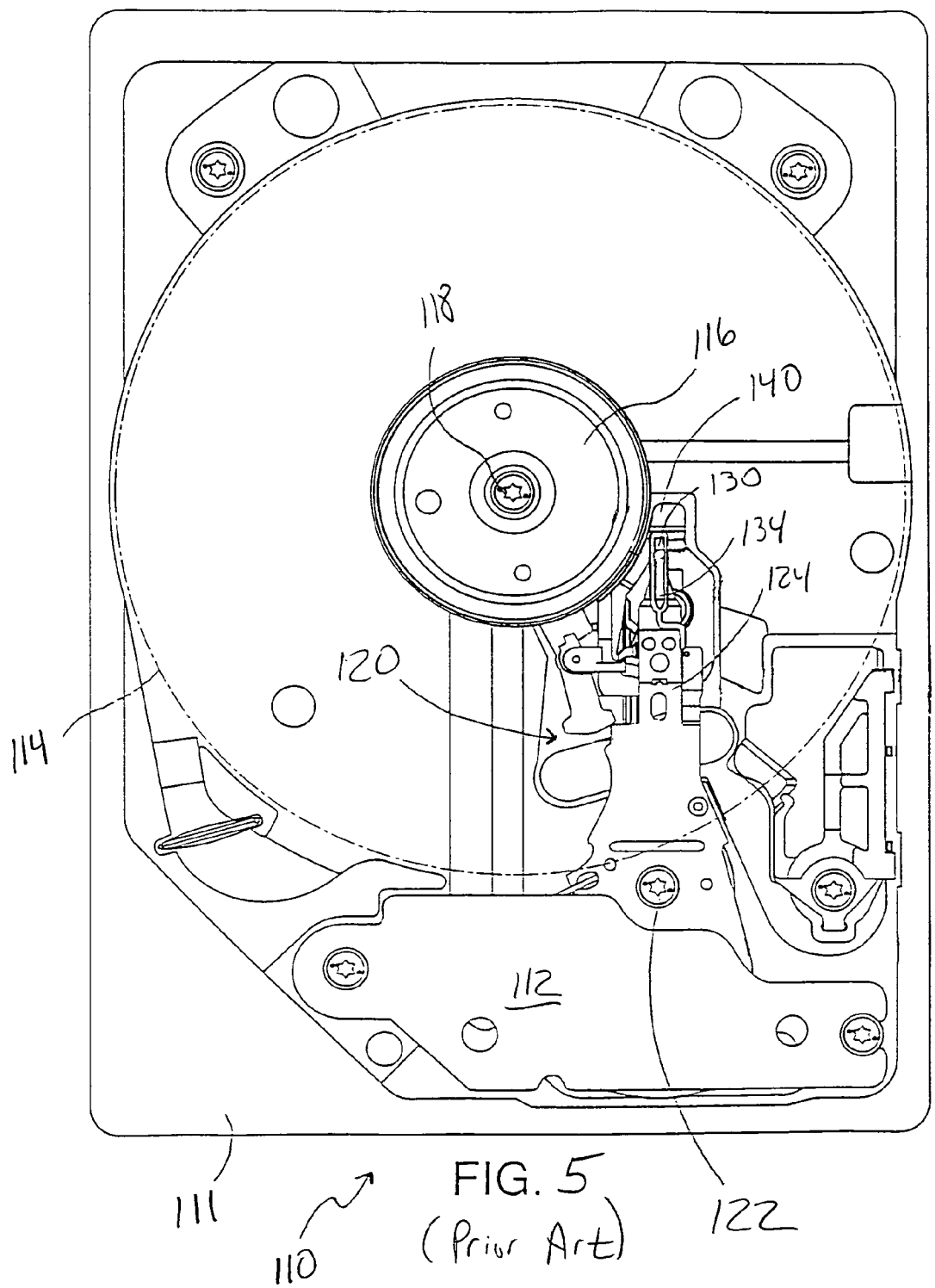
FIG. 5 is a plan view of another prior art disk drive that may be adapted to incorporate one or more head-resetting magnets that are disposed close to a corresponding head when in a parked position using a load/unload ramp, such an adaptation not being known to be within the prior art.
Figure 6A:
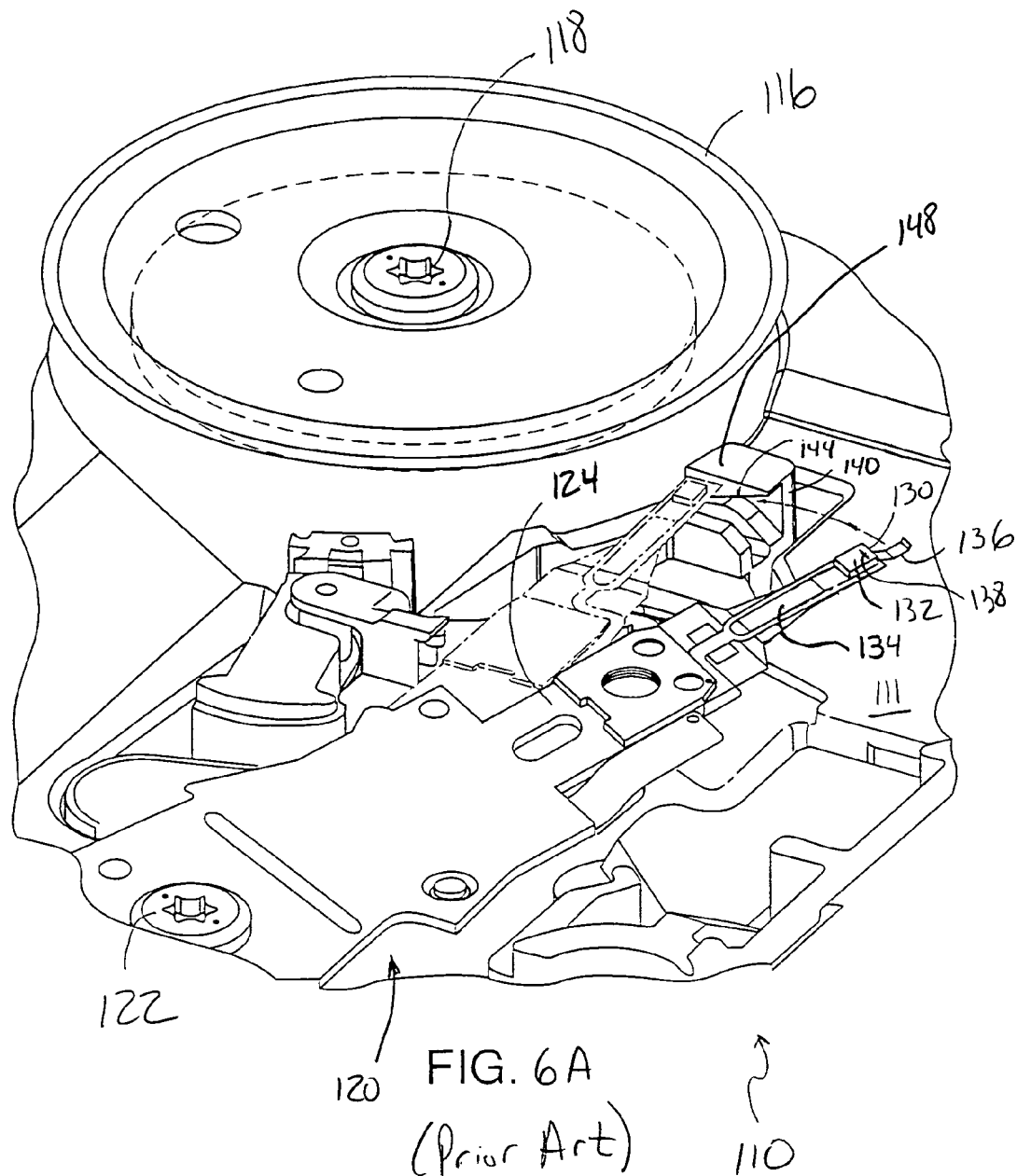
FIG. 6A is a perspective view of part of the disk drive of FIG. 5, prior to the parking of its head positioner assembly.
Figure 6B:
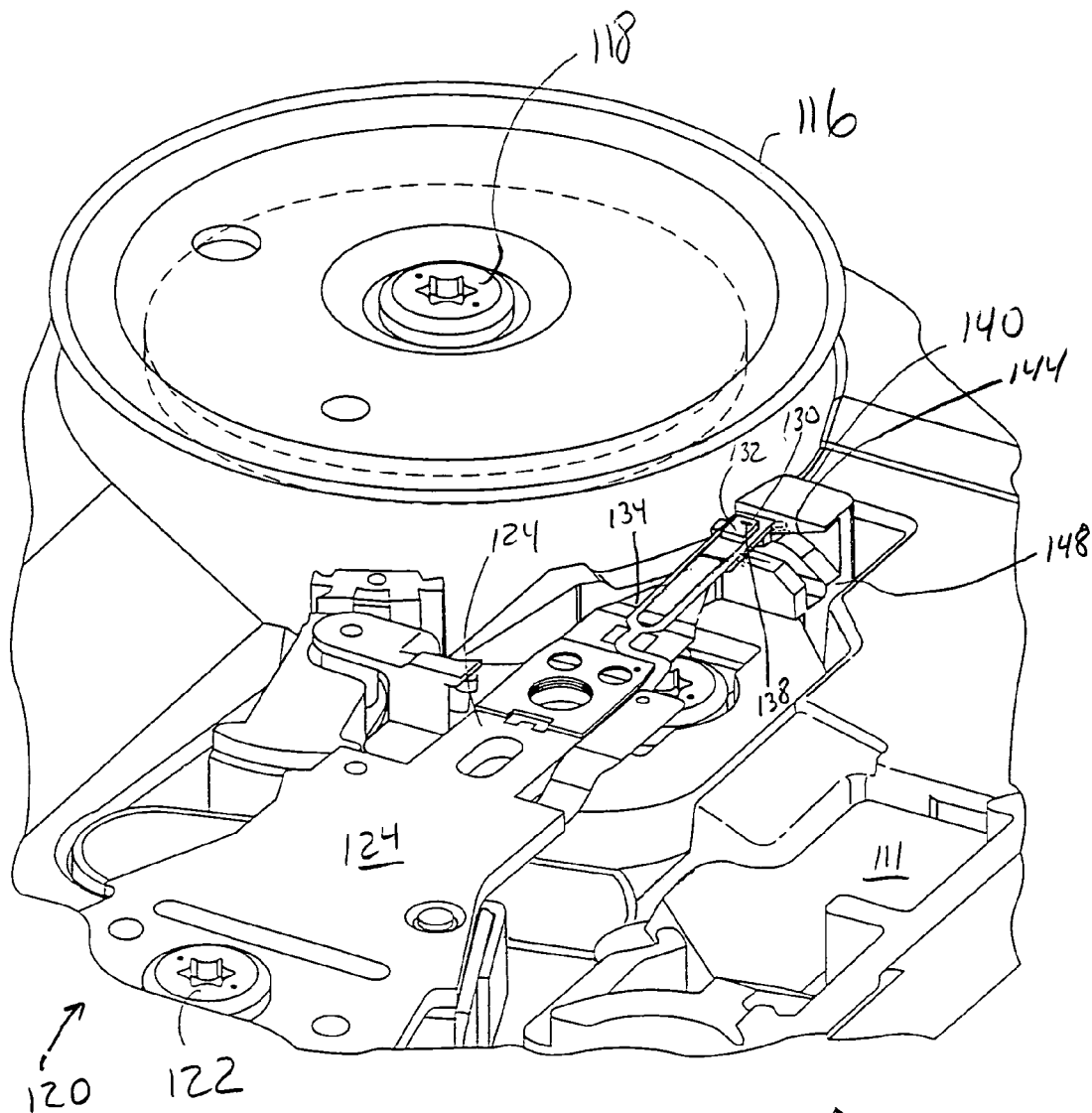
FIG. 6B is a perspective view of part of the disk drive of FIG. 5, after the parking of its head positioner assembly.

Another embodiment of a prior art disk drive 110 is illustrated in FIGS. 5-6B. However, this disk drive 110 also may be adapted to incorporate one or more magnets that are closely spaced to a corresponding read/write head when the head positioner assembly of the disk drive 110 is parked, the combination of which is not known to be in the prior art. The disk drive 110 generally includes a base plate 111. A cover (not shown) is typically disposed atop the base plate 111 and is detachably attached thereto to define an enclosed space for the various disk drive components. The disk drive 110 further includes a data storage disk 114 of any appropriate computer-readable data storage media. However, the data storage disk 114 of the disk drive 110 has been removed to show various other disk drive components. Accordingly, the data storage disk 114 is only shown in dashed outline in FIG. 5, and is not illustrated at all in FIGS. 6A-B. The data storage disk 114 is rotated by a spindle motor shaft 118 of a spindle motor, and is coupled therewith by a disk clamp 116.

The disk drive 110 also includes a head positioner assembly 120 which moves about a pivot bearing 122, which in turn is rotatably supported by the base plate 111 of the disk drive 110 and/or cover. FIGS. 6A-B illustrate that the head positioner assembly 120 is positioned between the base plate 111 and the data storage disk 114 (i.e., "under" the data storage disk 114 when the disk drive 110 is disposed in a horizontal orientation such that the cover is above the base plate 111). This head positioner assembly 120 generally includes a rigid actuator arm 124 which extends radially relative to the pivot bearing 122.

A suspension or load beam 134 is appropriately mounted to the actuator arm 124, and includes a lift tab 136 on its distal end or on a distal end of a flexure that may be used to interconnect the slider 130 and the suspension 134. The lift tab 136 may be of any appropriate size/shape/configuration. A slider 130 is appropriately interconnected with the suspension 134 at a location that is "spaced back" from the lift tab 136, or generally in direction of the pivot bearing 122. A "lower" or ABS surface 132 of the slider 130 faces the data storage disk 114, and includes a read/write head 138 of any appropriate type (e.g., giant magnetoresistive (GMR)) for exchanging information with the data storage disk 114.

A voice coil motor (VCM) 112 of the disk drive 110 at least operatively interfaces with the head positioner assembly 120. This VCM 112 generally imparts motion to the head positioner assembly 120 to position the head at the desired radial location of the data storage disk 114. The VCM 112 generally consists of a magnet(s) and a coil (not shown). The VCM 112 is disposed on the opposite side of the pivot bearing 122 in relation to the slider 130 and its head 138.

The disk drive 110 also includes a load/unload ramp 140 having a cam or unloading surface 144 which slopes away from the data storage disk 114 and toward the base plate 111 of the disk drive 110 so as to dispose the slider 130 and the data storage disk 114 in spaced relation when the head positioner assembly 120 is in a "parked" position (e.g., when disk drive operations have been terminated), as shown in FIG. 6B. The cam or unloading surface 144 may be of any appropriate shape. One or more features (not shown) may also be incorporated into the load/unload ramp 140 to provide at least some type of "lock" for the head positioner assembly 120 in its parked position. Typically a body 148 of the load/unload ramp 140 is mounted to the base plate 111 in any appropriate manner (e.g., using one or more screws that threadably engage with the base plate 111).

In the illustrated embodiment, the load/unload ramp 140 is disposed "under" the data storage disk 114 (e.g., generally between the data storage disk 114 and the base plate 111) and at least generally toward a radially inward portion of the data storage disk 114. The load/unload ramp 140 of course could also be disposed beyond a perimeter of the data storage disk 114 (not shown). The load/unload ramp 140 also could be adapted to accommodate the disk drive 110 having a plurality of data storage disks 114, and thereby a head positioner assembly 120 with a plurality of sliders 130, where it would be desirable to simultaneously park each of the plurality of read/write heads when not being used for disk drive operations. Load/unload ramps of this type typically would typically be disposed beyond the perimeter of the stack of spaced data storage disks.

The ABS surface 132 of the slider 130 may be in maintained in spaced relation to the data storage disk 114 during normal disk drive operations by an air bearing. This air bearing forces the slider 130 away from the disk 114. The slider 130 is typically biased toward the data storage disk 114 by the suspension 134 (e.g., to enhance control of the fly height of the slider 130). In the event that there is insufficient pressure acting on the ABS surface 132 of the slider 130, the suspension 134 would typically force the slider 130 into contact with the data storage disk 114. For instance, if rotation of the data storage disk 114 was terminated with the slider 130 being disposed directly under the data storage disk 114 in the illustrated embodiment, the biasing force provided by the suspension 134 would typically force the slider 130 into contact the disk 114. In order to reduce the potential for undesired contact between the slider 130 and the data storage disk 114 when disk drive operations are not being performed (e.g., in order to reduce the potential for the slider 130 "slapping" against the data storage disk 114 if the disk drive 110 is exposed to a force or shock of at least a certain type), which could damage the head 138 and/or the data storage disk 114, the head positioner assembly 120 is parked on or using the load/unload ramp 140.

Parking generally entails the VCM 112 moving the head positioner assembly 120 in the direction of the load/unload ramp 140 such that the lift tab 136 engages the cam or unloading surface 144 of the load/unload ramp 140. Continued movement of the head positioner assembly 120 forces the slider 130 away from the data storage disk 114 by the interaction of the lift tab 136 with the cam or unloading surface 144 of the load/unload ramp 140. Movement of the head positioner assembly 120 is then terminated with the lift tab 136 remaining in contact with the cam or unloading surface 144, which maintains a degree of separation between the slider 130 and the data storage disk 114. A "notch" could be formed in the cam or unloading surface 144 to at least somewhat "lock" the lift tab 136, and thereby the head positioner 120, in this position. This is commonly referred to as a "parked" position for the head positioner assembly 120. Sometimes the head or heads are referred to as being "parked" at this time as well.

Figure 7:
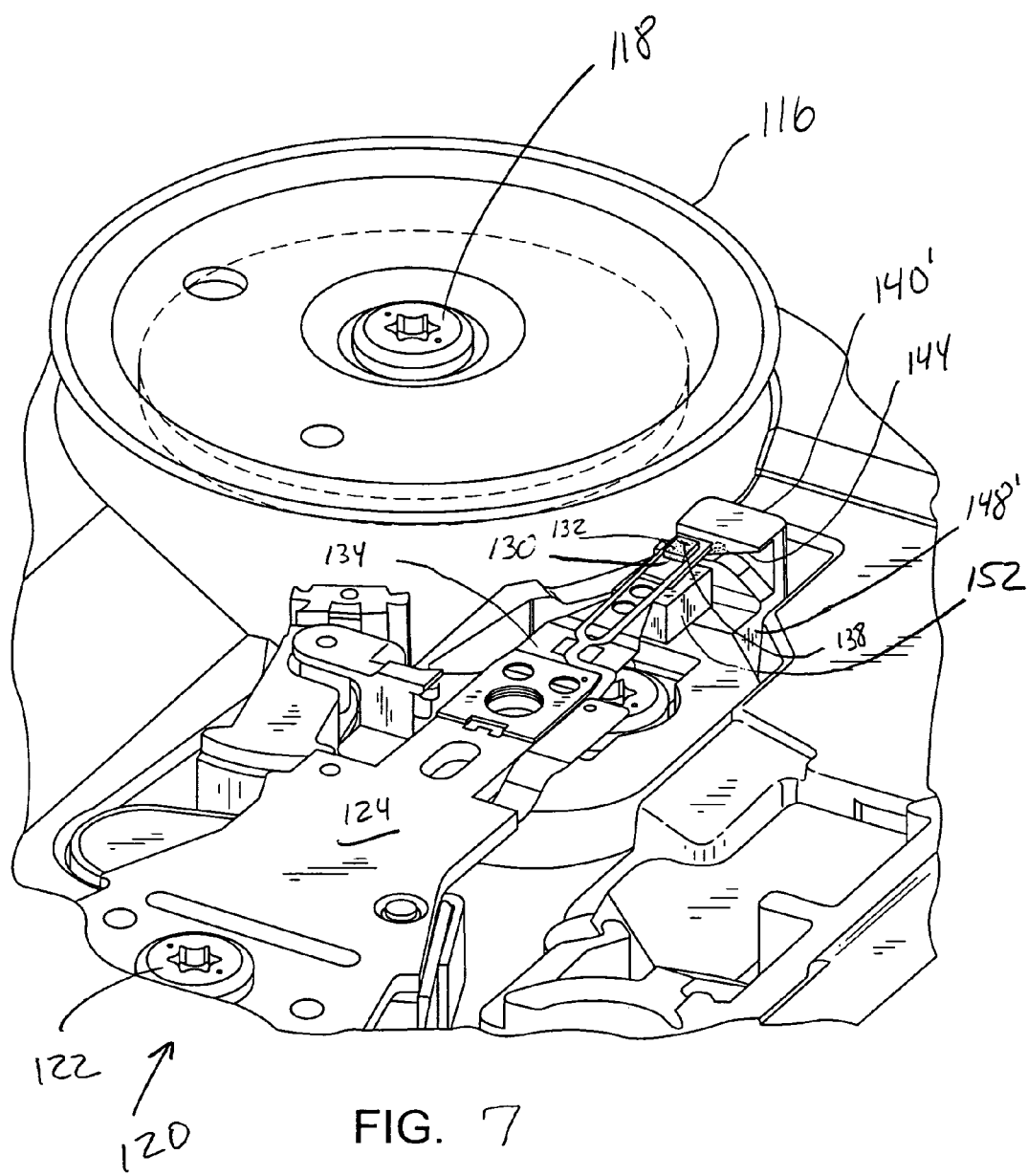
FIG. 7 is a perspective view of a variation of the load/unload ramp used by the disk drive of FIGS. 5-6B, that includes a head-resetting magnet that is disposed close to a corresponding head when in a parked position using a load/unload ramp.

FIG. 7 is a perspective view of a variation of the load/unload ramp 140 of FIGS. 5-6B, and which is not known to be within the prior art. Corresponding components are identified by the same reference numerals. A "single prime" designation is used to indicate the existence of a corresponding component that differs in at least some respect from that discussed above. The primary distinction between the load/unload ramp 140' of FIG. 7 and the load/unload ramp 140 of FIGS. 5-6B is the addition of a magnet 152. In the illustrated embodiment, the magnet 152 is appropriately mounted on or fixed to the body 148' of the load/unload ramp 140' so as to be disposed close to the head 138 of the slider 130 when the head positioner assembly 120 is in its parked position. The magnet 152 may be incorporated into the body 148' of the load/unload ramp 140 in any appropriate manner. It also may be possible for the magnet 152 to be mounted on a different structure and still be disposed sufficiently close to its corresponding head 138 to provide the desired resetting function when the head positioner assembly 120 is parked on the load/unload ramp 140'.

Generally, the magnet 152 provides a magnetic field that is sufficient to reset or correct the magnetization of the head 138 of the slider 130, if required. That is, the magnetization of the head 138 may degrade over time or otherwise may undesirably change. For instance, there may be a weakening of the magnetization along the edges of one or more of the various layers that may be used by the head 138. In such a case, the magnet 152 would reset or otherwise correct the magnetization of the head 138. Preferably the magnet 152 is strong enough to provide the resetting function at room temperature. However, heating of the head 138/slider 130 could be used in combination with the magnet 152 to provide the resetting function. For instance, a fly height control heater on the slider 130 could be used and operated when the slider 130 is parked on the load/unload ramp 140'. Fly height control heaters are disclosed in commonly assigned U.S. patent application Ser. No. 10/859,917, that is entitled "THERMAL ACTUATOR DESIGN FOR HARD DISK DRIVE MAGNETIC RECORDING," that was filed on Jun. 3, 2004, and the entire disclosure of which is incorporated by reference in its entirety herein.

The magnet 152 may be in the form of an electromagnet or a permanent magnet for providing a head-resetting function. A number of characterizations may be made in this regard. One is that magnet 152 preferably induces a magnetic field in the head 138 in a direction that is parallel to the ABS surface 132 of the slider 130. Another is that the magnet 152 provides a longitudinal magnetic field in which the head 138 is disposed when parked using the load/unload ramp 140'. Any appropriate materials may be utilized for the magnet 152. In one embodiment, the magnet 152 is in the form of neodymium iron boron (NdFeB). A relatively small size of a magnet 152 of this type (e.g., a rectangular shape 6.4 mm×4.4 mm×4.4 mm) should produce a magnetic field having a magnetic flux density of about 3,000 G at a distance of about 1 mm from the magnet 152. It was determined that disposing a head 138 in a 3,000 G magnetic field was enough to reset the head 138 of the slider 130 in an acceptable number of instances.

Figure 8:
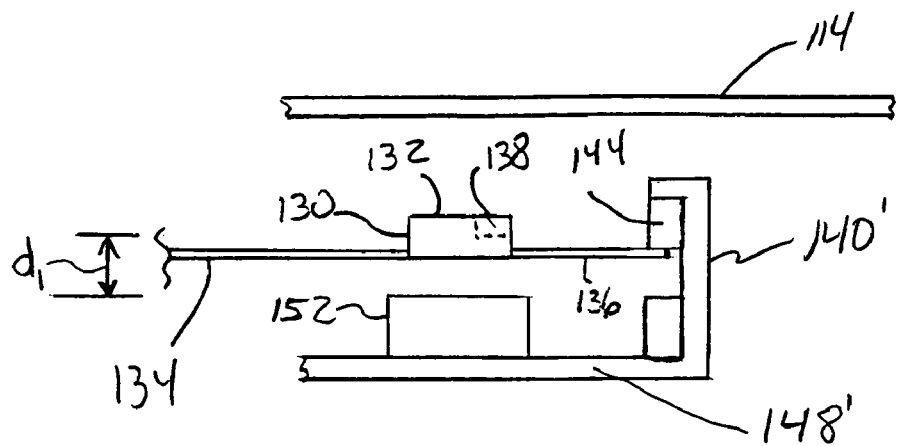
FIG. 8 is a schematic (side view) of the head positioner assembly when parked on the load/unload ramp of FIG. 7, illustrating the closely spaced relationship between the head-resetting magnet and the head.

FIG. 8 schematically illustrates the various spacing between the data storage disk 114, the slider 130, and the magnet 152 with the head positioner assembly 120 being parked on the load/unload ramp 140'. The distance $d_1$ represents the magnitude of the spacing between the magnet 152 and at least part of the head 138 (preferably the entire head 138). Preferably the distance $d_1$ is no more than about 1 millimeter. At a distance of about 1 millimeter from the magnet 152: 1) the longitudinal magnetic field has a magnetic flux density of at least about 2,750 G in one embodiment; 2) the longitudinal magnetic field has a magnetic flux density of at least about 3,000 G in one embodiment; 3) the longitudinal magnetic field strength is at least about 2,000 Oe in one embodiment; and 4) the longitudinal magnetic field strength is at least about 5,000 Oe in one embodiment. Disposing the head 138 within a magnetic field in accordance with any of these characterizations should provide a desired correction of its magnetization. Although the ABS surface 132 of the slider 130 faces away from the magnet 152 in the illustrated embodiment when being reset, the ABS surface 132 of the slider 130 of course could face toward the magnet 152 and be reset in the manner discussed herein (not shown).

Figure 9:
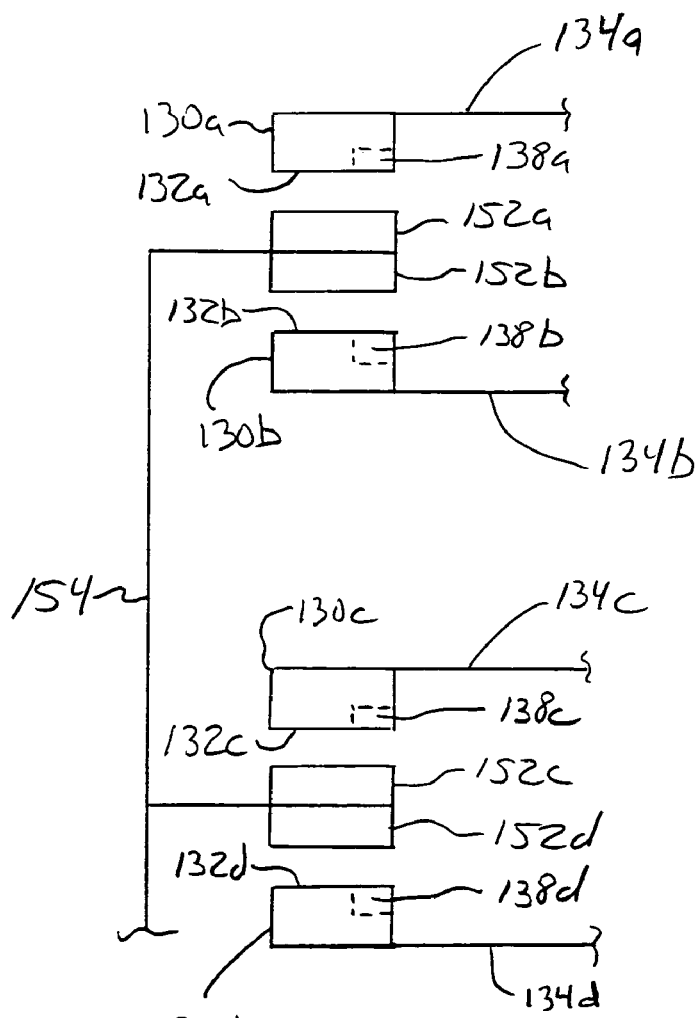
FIG. 9 is a schematic of a head positioner assembly that includes a plurality of heads that are parked on a load/unload ramp, where a plurality of head-resetting magnets are provided and disposed in closely spaced relationship with their corresponding head.

FIG. 9 is one embodiment for providing a head-resetting function for a head positioner assembly having multiple sliders 130, and thereby multiple heads 138, at least generally in accordance with the embodiment of FIG. 8. The various heads 138 are parked in the view presented by FIG. 9. Any number of heads 138 could be parked, and could be reset at this time by preferably closely-spaced magnets 152. Generally, such a head positioner assembly could include a suspension 134a, slider 130a, ABS surface 132a, and head 138a for interacting with one side of a first data storage disk (not shown); a suspension 134b, slider 130b, ABS surface 132b, and head 138b for interacting with the opposite side of the first data storage disk; a suspension 134c, slider 130c, ABS surface 132c, and head 138c for interacting with one side of a second data storage disk (not shown); and a suspension 134d, slider 130d, ABS surface 132d, and head 138d for interacting with the opposite side of the second data storage disk. Therefore, the sliders 130a, 130b typically would be biased toward each other during disk drive operations, and sliders 130c, 130d typically would be biased toward each other during disk drive operations as well. The load/unload ramp would be configured to exert a force to bias the suspensions 134a, 134b away from each other, and to bias the suspensions 134c, 134d away from each other.

FIG. 9 generally depicts the parked position for a head positioner assembly having four sliders 130a-d. Any number of sliders 130 could be utilized by the head positioner assembly and be reset in the manner discussed herein. As noted, the sliders 130a, 130b are being biased away from each other by the load/unload ramp (e.g., an appropriate adaptation of the load/unload ramp 140') in the FIG. 9 configuration. Similarly, the sliders 130c, 130d are being biased away from each other by the load/unload ramp (e.g., an appropriate adaptation of the load/unload ramp 140') in the FIG. 9 configuration as well. A single load/unload ramp could be used to park all of the sliders 130a-d. A plurality of magnets 152a, 152b, 152c, and 152d are interconnected with an appropriate support 154 so as to be closely spaced from their corresponding slider 130a, 130b, 130c, and 130d in accordance with the embodiment of FIG. 8. Some magnetic isolation may be required between adjacent pairs of magnets 152. Also, it may be possible to dispose a single head-resetting magnet between corresponding pairs of sliders 130 as well (e.g., it may be possible for a single magnet to reset multiple, closely spaced heads 138).

The support 154 is only schematically illustrated in FIG. 9, and could be part of a common load/unload ramp that maintains the sliders 130a-d in spaced relation to their corresponding data storage disk when parked. That is, multiple head-resetting magnets 152 could be incorporated on a single load/unload ramp. Another option would be for the support 154 to be a separate structure from the load/unload ramp (e.g., generally in the form of an E-block or the like), and that is interconnected with the base plate and/or cover of the disk drive. In any case, each magnet 152a-d is closely spaced from its corresponding head 138a-d when parked for providing the above-noted head-resetting function, and in accordance with the embodiment of FIG. 8.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:
   a first data storage disk;
   a head positioner assembly comprising a first head, wherein said first head is associated with said first data storage disk;
   a drive at least operatively interconnected with said head positioner assembly;
   a load/unload ramp; and
   a first magnet separate from said head that is used to reset a magnetization of the first head and disposed in proximity to said first head only when said head positioner assembly is parked on said load/unload ramp, wherein said first magnet provides a longitudinal magnetic field to said head in a direction that is parallel to an air-bearing surface (ABS) of the first head.

2. A disk drive, as claimed in claim 1, wherein said head positioner assembly further comprises a first actuator arm, a first suspension interconnected with said first actuator arm, and a first slider interconnected with said first suspension, wherein said first slider comprises said first head.

3. A disk drive, as claimed in claim 2, further comprising an enclosure, wherein said first data storage disk, said head positioner assembly, said drive said load/unload ramp, and said first magnet are disposed within said enclosure.

4. A disk drive, as claimed in claim 1, further comprising a cover and a base plate that are interconnected to define an enclosed space, wherein said first data storage disk, said head positioner assembly, said drive, said load/unload ramp, and said first magnet are disposed within said enclosed space.

5. A disk drive, as claimed in claim 1, wherein said drive comprises a voice coil motor.

6. A disk drive, as claimed in claim 1, wherein said first magnet is a permanent magnet.

7. A disk drive, as claimed in claim 1, wherein said first magnet is an electromagnet.

8. A disk drive, as claimed in claim 1, wherein said first magnet provides a longitudinal magnetic field strength of at least about 2,000 Oe in which said first head is disposed when said head positioner assembly is parked on said load/unload ramp.

9. A disk drive, as claimed in claim 1, wherein said first magnet provides a longitudinal magnetic field strength of at least about 5,000 Oe in which said first head is disposed when said head positioner assembly is parked on said load/unload ramp.

10. A disk drive, as claimed in claim 1, wherein said first magnet provides a longitudinal magnetic field with a magnetic flux density of at least about 2,750 G in which said first head is disposed when said head positioner assembly is parked on said load/unload ramp.

11. A disk drive, as claimed in claim 1, wherein said first magnet provides a longitudinal magnetic field with a magnetic flux density of at least about 3,000 G in which said first head is disposed when said head positioner assembly is parked on said load/unload ramp.

12. A disk drive, as claimed in claim 1, wherein said first magnet is disposed no more than about 1 millimeter from said first head when said head positioner assembly is parked on said load/unload ramp.

13. A disk drive, comprising:
   a first data storage disk;
   a head positioner assembly comprising a first head, wherein said first head is associated with said first data storage disk;
   a drive at least operatively interconnected with said head positioner assembly;
   a load/unload ramp; and
   a first magnet separate from said head that is used to reset a magnetization of said head and, wherein said first magnet is disposed no more than about 1 millimeter from said first head only when said head positioner assembly is parked on said load/unload ramp, wherein said first magnet provides a longitudinal magnetic field to said head in a direction that is parallel to an air-bearing surface (ABS) of the first head.

14. A disk drive, as claimed in claim 13, wherein said head positioner assembly further comprises a first actuator arm, a first suspension interconnected with said first actuator arm, and a first slider interconnected with said first suspension, wherein said first slider comprises said first head.

15. A disk drive, as claimed in claim 14, further comprising an enclosure, wherein said first data storage disk, said head positioner assembly, said drive said load/unload ramp, and said first magnet are disposed within said enclosure.

16. A disk drive, as claimed in claim 13, further comprising a cover and a base plate that are interconnected to define an enclosed space, wherein said first data storage disk, said head positioner assembly, said drive, said load/unload ramp, and said first magnet are disposed within said enclosed space.

17. A disk drive, as claimed in claim 13, wherein said drive comprises a voice coil motor.

18. A disk drive, as claimed in claim 13, wherein said first magnet is a permanent magnet.

19. A disk drive, as claimed in claim 13, wherein said first magnet is an electromagnet.

20. A disk drive, as claimed in claim 13, wherein said first magnet provides a longitudinal magnetic field strength of at least about 2,000 Oe in which said first head is disposed when said head positioner assembly is parked on said load/unload ramp.

21. A disk drive, as claimed in claim 13, wherein said first magnet provides a longitudinal magnetic field strength of at least about 5,000 Oe in which said first head is disposed when said head positioner assembly is parked on said load/unload ramp.

22. A disk drive, as claimed in claim 13, wherein said first magnet provides a longitudinal magnetic field with a magnetic flux density of at least about 2,750 G in which said first head is disposed when said head positioner assembly is parked on said load/unload ramp.

23. A disk drive, as claimed in claim 13, wherein said first magnet provides a longitudinal magnetic field with a magnetic flux density of at least about 3,000 G in which said first head is disposed when said head positioner assembly is parked on said load/unload ramp.

24. A disk drive, comprising:
a first data storage disk;
a head positioner assembly comprising a first head, wherein said first head is associated with said first data storage disk;
a drive at least operatively interconnected with said head positioner assembly;
a load/unload ramp; and
a first magnet separate from said head that is used to reset a magnetization of said first head, wherein said load/unload ramp incorporates said first magnet proximate to said first head when said head positioner assembly is parked on said load/unload ramp, and wherein said first magnet provides a magnetic field to said head in a direction that is parallel to an air-bearing surface (ABS) of the first head.

25. A disk drive, as claimed in claim 24, wherein said first magnet is a permanent magnet.

26. A disk drive, as claimed in claim 24, wherein said first magnet is disposed no more than about 1 millimeter from said first head when said head positioner assembly is parked on said load/unload ramp.

* * * * *